(12) United States Patent
Moll et al.

(10) Patent No.: US 9,827,618 B2
(45) Date of Patent: Nov. 28, 2017

(54) CRAYON CARVING DEVICE

(71) Applicant: CRAYOLA, LLC, Easton, PA (US)

(72) Inventors: Joseph Thomas Moll, Bethlehem, PA (US); Robert J. Henry, Bethlehem, PA (US); Y K Ho, Bethlehem, PA (US); Gregory Ronald Nungester, Milford, NJ (US)

(73) Assignee: CRAYOLA, LLC, Easton, PA (US)

( * ) Notice: Subject to any disclaimer, the term of this patent is extended or adjusted under 35 U.S.C. 154(b) by 0 days.

(21) Appl. No.: 14/996,221

(22) Filed: Jan. 14, 2016

(65) Prior Publication Data

US 2016/0207123 A1  Jul. 21, 2016

Related U.S. Application Data

(60) Provisional application No. 62/103,918, filed on Jan. 15, 2015.

(51) Int. Cl.
  *B23Q 35/10* (2006.01)
  *B23C 1/16* (2006.01)
  (Continued)

(52) U.S. Cl.
  CPC .............. *B23C 1/16* (2013.01); *B23Q 35/10* (2013.01); *B43K 19/003* (2013.01); *B44B 3/002* (2013.01);
  (Continued)

(58) Field of Classification Search
  CPC .......... B23C 1/16; B23Q 35/10; B23Q 35/48; B23Q 2735/002; B23Q 2735/004;
  (Continued)

(56) References Cited

U.S. PATENT DOCUMENTS

| 99,794 A | * | 2/1870 | Spencer .................. B44B 3/002 |
|---|---|---|---|
| | | | 144/150 |
| 2,017,843 A | | 10/1935 | Cuthbert |

(Continued)

FOREIGN PATENT DOCUMENTS

| CH | 197659 A | * | 5/1938 | ............. B44B 3/002 |
|---|---|---|---|---|
| CN | 205818759 U | * | 12/2016 | |

OTHER PUBLICATIONS

Machine Translation CH 197659 A, which CH '659 was published May 1938.*

(Continued)

*Primary Examiner* — Erica E Cadugan
(74) *Attorney, Agent, or Firm* — Shook, Hardy & Bacon L.L.P.

(57) ABSTRACT

Devices, kits, and methods for making a carved crayon are provided. In one aspect, a crayon carving device includes a base, a pantograph armature coupled to the base, a crayon positioner, and at least one guide template parallel to the crayon positioner. The pantograph armature includes a motorized drive shaft with a drill tip for carving an outside surface of a crayon body, as well as a guide tip for tracing along a guide template that directs where the drill tip carves. In some embodiments, the guide template includes a stationary bridge support and a plurality of removable carving bucks that insert into one of multiple openings on the bridge support. The surface features of each of the carving bucks may be traced by the guide tip to generate a corresponding carving on the surface of a crayon body.

17 Claims, 16 Drawing Sheets

(51) Int. Cl.
  *B44B 1/02* (2006.01)
  *B44B 1/06* (2006.01)
  *B44B 3/04* (2006.01)
  *B44B 3/06* (2006.01)
  *B43K 19/00* (2006.01)
  *B44B 3/00* (2006.01)
  *B43K 19/14* (2006.01)

(52) U.S. Cl.
  CPC ............... *B44B 3/04* (2013.01); *B44B 3/066* (2013.01); *B23Q 2735/004* (2013.01); *B23Q 2735/045* (2013.01); *B43K 19/145* (2013.01); *Y10T 29/5107* (2015.01); *Y10T 409/3014* (2015.01); *Y10T 409/301344* (2015.01); *Y10T 409/301624* (2015.01); *Y10T 409/303696* (2015.01)

(58) Field of Classification Search
  CPC .......... B23Q 2735/006; B23Q 2735/02; B23Q 2735/04; B23Q 2735/045; B44B 3/002; B44B 3/04; B44B 3/066; Y10T 409/303696; Y10T 409/301232; Y10T 409/301288; Y10T 409/301344; Y10T 409/3014; Y10T 409/30336; Y10T 409/302688
  USPC ............ 409/130, 86–89, 124, 112; 33/23.01, 33/23.08, 23.11, 25.1, 25.2, 25.4, 22
  See application file for complete search history.

(56) References Cited

U.S. PATENT DOCUMENTS

| | | |
|---|---|---|
| 2,197,884 A | 4/1940 | Ackerman et al. |
| 4,141,145 A | 2/1979 | Schiffman |
| 4,175,329 A | 11/1979 | Schimmel |
| 4,227,557 A | 10/1980 | Allen |

OTHER PUBLICATIONS

Merriam-Webster's Collegiate Dictionary, 10$^{th}$ ed., p. 230, definition of "Commensurate" and "Commensurable".*
International Search Report with Written Opinion dated Mar. 29, 2016 in PCT Patent Application No. PCT/US2016/13536 11 pages.
International Preliminary Report on Patentability dated Feb. 24, 2017 in PCT Patent Application No. PCT/US16/13536, 17 pages.

* cited by examiner

PLURALITY OF ICON CARVING BUCKS COMMENSURATE IN SIZE TO ONE OR MORE OF A FIRST CRAYON SIZE AND A SECOND CRAYON SIZE SMALLER THAN THE FIRST CRAYON SIZE

*FIG. 24.*

DEBRIS-REMOVAL DEVICE 400, SUCH AS, FOR EXAMPLE, A BRUSH

*FIG. 25.*

CRAYON CARVING DEVICE

CROSS-REFERENCE TO RELATED APPLICATIONS

This application is a nonprovisional of an claims priority to U.S. Provisional Application No. 62/103,918, filed Jan. 15, 2015, entitled "Crayon Carving Device," the entire contents of which is hereby incorporated by reference.

SUMMARY

Aspects of the disclosure are defined by the claims below, not this summary. A high-level overview of various features are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

This disclosure describes, among other things, devices, kits, and methods for carving a crayon. In particular, one aspect of the disclosure is directed to a device including a carving mechanism, such as a motorized drill, that carves an outer surface of a crayon body in response to interaction with one or more corresponding template features traced by a user. During such carving, a template design and/or feature may be traced with a guide tip on a first portion of a pantograph armature, while a motorized drill tip on a second portion of the armature carves a crayon with a shape that corresponds to the traced template design. A single or multiple carvings may be made with respect to a particular crayon body, at one or multiple depths in the surface of the rayon body. As such, interaction with the one or more template features being traced by the user may directly correlate to the corresponding carved crayon, such as the depth of tracing, amount of pressure applied during tracing, spacing of one or more template features being traced, and the like.

A crayon positioning mechanism may be used to secure a particular crayon body in one or more orientations or positions to provide a carving surface for receiving markings from the carving mechanism. In some embodiments, the crayon positioning mechanism, template tracing and/or crayon carving features of the crayon carving device may be coupled to a single unit, such as a base and/or support that is configured to support at least a portion of the crayon positioning mechanism, at least a portion of the pantograph armature, and at least a portion of the template tracing features. In some aspects, the base unit may couple the crayon positioning component and the template tracing features in a parallel orientation, such that the distance between such components and/or relative position during carving provides for synchronized and/or simultaneous contact of the features of a pantograph armature with both the crayon body and the tracing template (i.e., a portion of the pantograph armature contacting the crayon body, synchronized with a portion of the pantograph armature contacting the template tracing feature(s)).

In further embodiments, the crayon carving device includes a base, a pantograph armature coupled to the base, a crayon positioner, and at least one guide template parallel to the crayon positioner. In one aspect, the pantograph armature includes a motorized drive shaft with a drill tip for carving a surface of a crayon body, as well as a guide tip for tracing along a guide template that directs where the drill tip carves. In some embodiments, the guide template includes a stationary bridge support and a plurality of removable carving bucks that insert into one of multiple openings on the bridge support. The surface features of each of the carving bucks may be traced by the guide tip to generate a corresponding carving on the surface of a crayon body.

In some embodiments, the crayon positioning mechanism may be configured to secure one or multiple different sizes of crayon bodies. For example, a first crayon body size may be secured by the crayon positioning mechanism, while a second, different crayon body size may be secured by the crayon positioning mechanism based on interaction with at least one adapter mechanism. In one aspect, a crayon positioning mechanism may be configured to secure a first crayon body size, such as a larger crayon body (i.e., a "jumbo" sized crayon), without an adapter mechanism, and may be configured to secure a second crayon body size, such as a smaller crayon body (i.e., a regular crayon body) utilizing at least one adapter mechanism. Embodiments of the crayon carving device may be utilized with a first crayon size and/or a second crayon size based on one or more adapters, one or more crayon features configured to mate to one or more features of the crayon positioning mechanism, and one or more crayon body characteristics (i.e., the crayon components, crayon tip arrangement, crayon end arrangement, crayon body surface, crayon composition, crayon orientation, etc.). As such, in some embodiments, the crayon carving device may include a pantograph armature configured to coordinate the carving a variety of crayon bodies using multiple types and/or styles of guide templates, while utilizing a spacing between the crayon positioning mechanism and the desired carved-crayon features of a chosen design template.

Similarly, the carving features of a guide template, such as the one or more carving bucks, may correspond to a particular size of crayon, such as a regular-sized carving buck for carving regular-sized crayons, and a jumbo-sized carving buck for carving jumbo crayons. In another aspect, a universal stationary bridge may include a variety of coupling mechanisms, such as openings for inserted pegs or other coupling features, for either jumbo or regular-sized carving bucks. The carving bucks may include various features for replicating on the surface of a carved crayon, such as letters, icons, or other surface alterations directed by the user by virtue of the guide tip. As such, the crayon body may become carved to a user's specification, upon manipulation of the guide tip by the user, and the corresponding contact of the drill tip with the crayon body in the crayon positioning mechanism.

DESCRIPTION OF THE DRAWINGS

Illustrative embodiments of the invention are described in detail below with reference to the attached drawing figures, and wherein:

FIG. 24 schematically depicts carving bucks used in some embodiments.

FIG. 25 schematically depicts an accessory.

DETAILED DESCRIPTION

Figure 1:
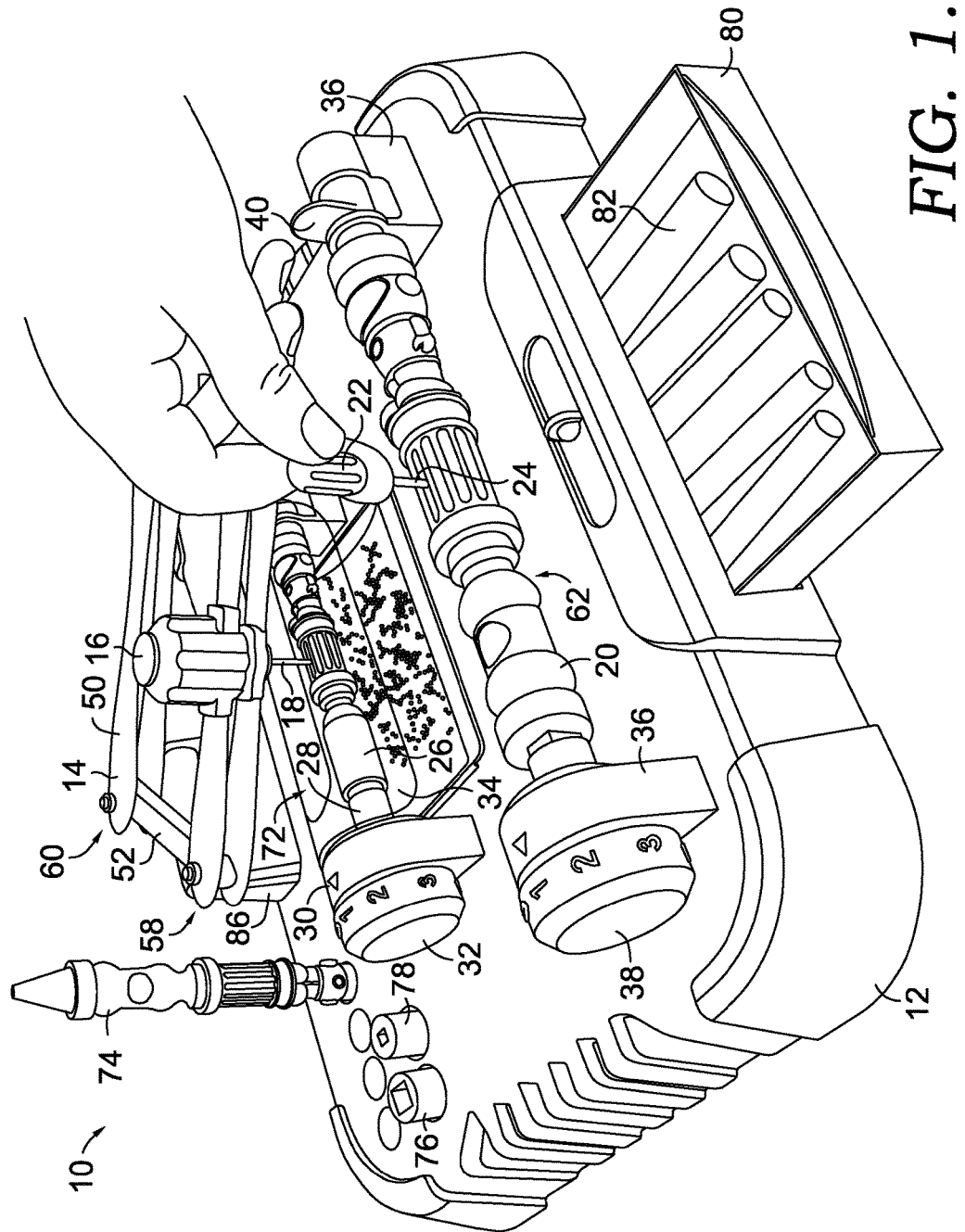
FIG. 1 is a top, perspective view of a crayon carving device in a first position, in accordance with embodiments of the disclosure.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Devices, kits, and methods are described herein for carving a crayon. In particular, one aspect of the disclosure is directed to a device including a motorized drill that carves an outer surface of a crayon in response to one or more corresponding template features traced by a user. During such carving, a template design and/or feature is traced with a guide tip on a first portion of a pantograph armature, while a motorized drill tip on a second portion of the armature carves a crayon with a shape that corresponds to the traced template design. In embodiments, the crayon positioning, template tracing, and corresponding crayon carving features of the crayon carving device are coupled to a single unit, such as a base. The base unit may couple the crayon positioning component and the template tracing features in a parallel orientation, such that their distancing and position provide for synchronized and simultaneous contact of the features of a pantograph armature with both the crayon body and the tracing template.

In further embodiments, the crayon carving device includes a base, a pantograph armature coupled to the base, a crayon positioner, and at least one guide template parallel to the crayon positioner. The pantograph armature includes a motorized drive shaft with a drill tip for carving an outside surface of a crayon body, as well as a guide tip for tracing along a guide template that directs where the drill tip carves. In some embodiments, the guide template includes a stationary bridge support and a plurality of removable carving bucks that insert into one of multiple openings on the bridge support. The surface features of each of the carving bucks may be traced by the guide tip to generate a corresponding carving on the surface of a crayon body.

In some embodiments, the crayon positioner may be configured to secure either a regular crayon body size or a larger (i.e., "jumbo") crayon body size. Similarly, the carving bucks may correspond to a particular size of crayon, such as a regular-sized carving buck for carving regular crayons, and a jumbo-sized carving buck for carving jumbo crayons. In another aspect, the universal stationary bridge may include openings for coupling to either jumbo or regular-sized carving bucks. The carving bucks may include various features for replicating on the surface of a carved crayon, such as letters, icons, or other surface alterations directed by the user by virtue of the guide tip. As such, the crayon body may become carved to a user's specification upon manipulation of the guide tip by the user, and the corresponding contact of the drill tip with the crayon body in the crayon positioner Accordingly, one exemplary aspect of the invention is directed to a crayon carving device including a base; a pantograph armature coupled to the base, the pantograph armature including a motorized drive shaft and a guide tip; at least one crayon positioner configured to secure at least one crayon body; and at least one guide template corresponding to the at least one crayon body. In embodiments, the motorized drive shaft is configured to alter at least one surface of the at least one crayon body secured by the at least one crayon positioner in response to at least one indication of contact between the cutter guide and the at least one guide template.

A further aspect of the invention is directed to a crayon carving device having a base support; a tracing guide coupled to the base, wherein the tracing guide includes a guide tip and a drill tip separated a distance from the guide tip; a crayon positioner coupled to the base at a first position; a mounting bridge coupled to the base at a second position, wherein the second position is parallel to and spaced apart from the first position; and at least one template feature removably coupled to the mounting bridge.

In another aspect of the invention, a crayon carving kit includes: a crayon positioner configured to secure a crayon body at a first end and a second end of the crayon body, wherein the crayon positioner includes a tension release for coupling and decoupling the crayon body with the crayon positioner, a stationary tip stabilizer for securing a tip end of a crayon body having a first size, and a crayon adapter configured to secure a tip end of a crayon body having a second size that is smaller than the first size; a carving template parallel to the crayon positioner, said carving template comprising one or more of the following: at least one carving buck corresponding to an exterior surface of the crayon body having a first size, at least one carving buck corresponding to an exterior surface of the crayon body having a second size, and at least one carving totem corresponding to at least a portion of a crayon body; and a carving device comprising a drill bit and a carving guide, wherein the carving device is configured to remove at least a portion of an exterior surface of a crayon body secured by the crayon positioner based on 1) the orientation of the carving guide with respect to the carving template, and 2) the corresponding orientation of the drill bit with respect to the crayon body secured by the crayon positioner.

In further aspects of the invention, a crayon carving device include a base; a pantograph armature coupled to the base, the pantograph armature comprising a motorized stylus and a cutter guide; at least one crayon positioner configured to secure at least one crayon body; and at least one guide template corresponding to the at least one crayon body, wherein the motorized stylus is configured to alter at least one surface of the at least one crayon body secured by the at least one crayon positioner in response to at least one indication of interaction between the cutter guide and the at least one guide template.

In another embodiment, a crayon carving device includes a base support; a tracing guide coupled to the base support, wherein the tracing guide comprises: a guide tip; and a drill tip separated a distance from the guide tip; a crayon positioner coupled to the base support at a first position; a mounting bridge coupled to the base support at a second position, wherein the second position is parallel to and spaced apart from the first position; and at least one template feature removably coupled to the mounting bridge.

In yet another aspect, a crayon carving kit a crayon positioner is configured to secure a crayon body at a first end and a second end of the crayon body, wherein the crayon positioner comprises: a tension release for coupling and decoupling the crayon body with the crayon positioner, a crayon stabilizer for securing a tip end of a crayon body having a first size, and a crayon adapter configured to secure a tip end of a crayon body having a second size that is smaller than the first size. Further aspects include a carving template corresponding to the crayon positioner, said carving template comprising one or more of the following: at least one carving buck corresponding to an exterior surface of the crayon body having a first size; and at least one carving buck corresponding to an exterior surface of the crayon body having a second size; and a carving device comprising a drill tip and a carving guide, wherein the carving device is configured to remove at least a portion of an exterior surface of a crayon body secured by the crayon positioner based on 1) orientation of the carving guide with respect to the carving template, and 2) corresponding orientation of the drill tip with respect to the crayon body secured by the crayon positioner.

With reference now to the figures, a crayon carving device, kit, and method of using a crayon carving device is described in accordance with embodiments of the invention. Various embodiments are described with respect to the figures in which like elements are depicted with like reference numerals.

With reference initially to FIGS. 1-6, and exemplary crayon carving device 10 is shown with embodiments of various features for creating a carved crayon body. In FIG. 1, the exemplary crayon carving device 10 includes a base 12, a pantograph armature 14, a motorized drive shaft 16 with a drill bit 18, a guide template 20, and a cutter guide 22 having a guide tip 24 that directs the carving of crayon body 26. Additionally, embodiments of the crayon carving device 10 include a crayon positioner 28 having a first mount 30 with a first dial 32, a protective shield 34 with at least one opening 72, a second mount 36 with a second dial 38, a template release tab 40, and a crayon release tab 42.

In some aspects, a motor of the motorized drive shaft 16 may be controlled by a power switch 44. The pantograph armature 14 of the crayon carving device 10 may include a guide tip arm 46, a drive shaft arm 48, a first support arm 50, and a second support arm 52, which may all be coupled together in a parallelogram configuration to produce movement of one portion of the armature that is identical to another portion of the armature, as further described below. The arms of the pantograph armature 14 may be coupled at a first joint 54, a second joint 56, a third joint 58, and a fourth joint 60.

With continued reference to FIG. 1, the exemplary crayon carving device 10 is configured to trace the template surface 62 of a guide template 20, such as the totem guide template 20 in the exemplary embodiment. Template surface 62 includes a three-dimensional (3-D) guide surface 64 that corresponds to the carved 3-D crayon carvings 66 on the crayon body 26. In some aspects, the crayon carving device 10 includes a tray 68 for catching carvings 70 from the carved crayon body 26, carved crayon holders 74, a large crayon tip adapter 76, a small crayon tip adapter 78, and a drawer 80 for holding crayon bodies 82.

Figure 2A:
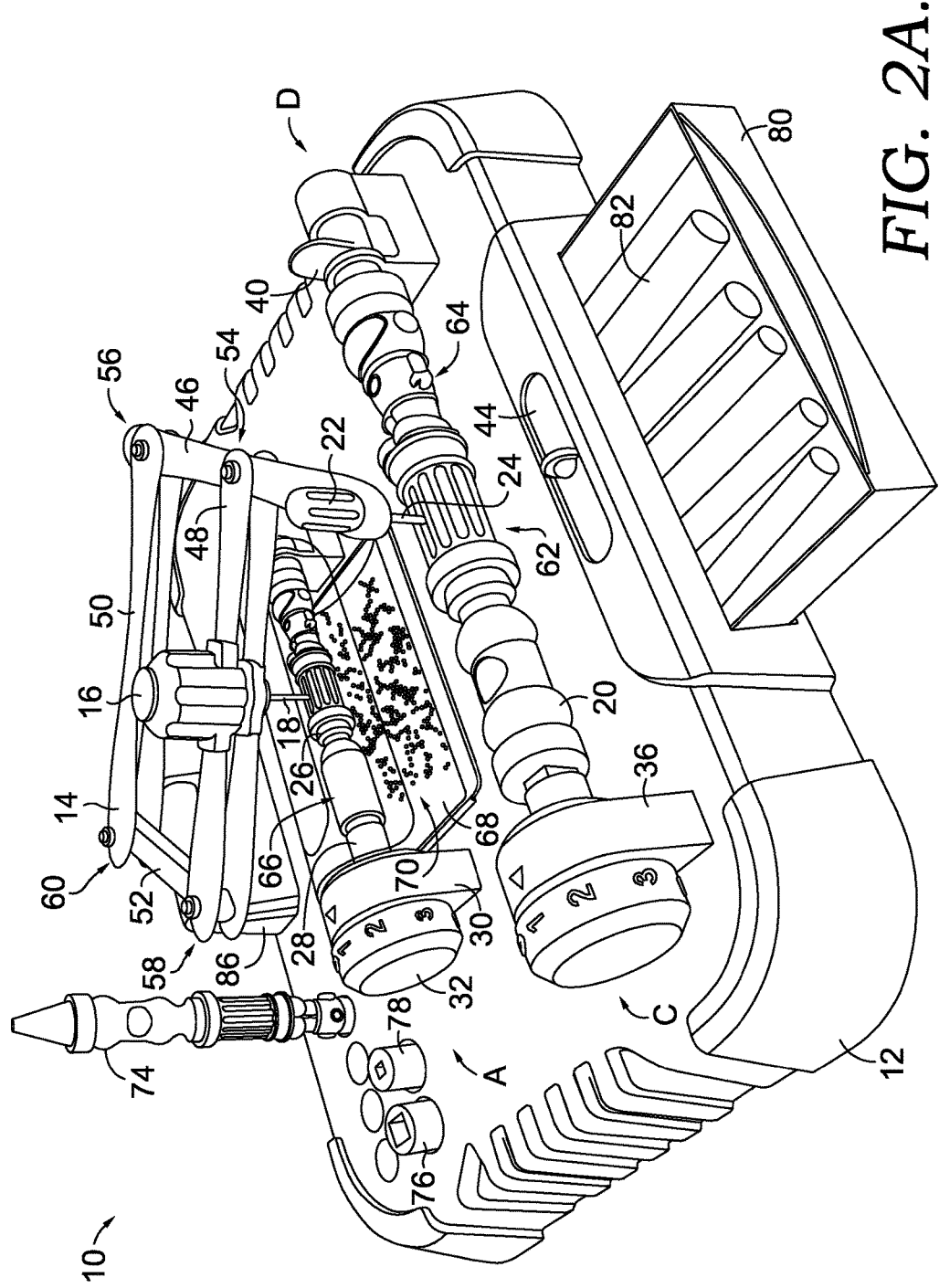
FIG. 2A is a top, perspective view of the crayon carving device of FIG. 1, with a user's hand removed from view, in accordance with embodiments of the disclosure.
Figure 2B:
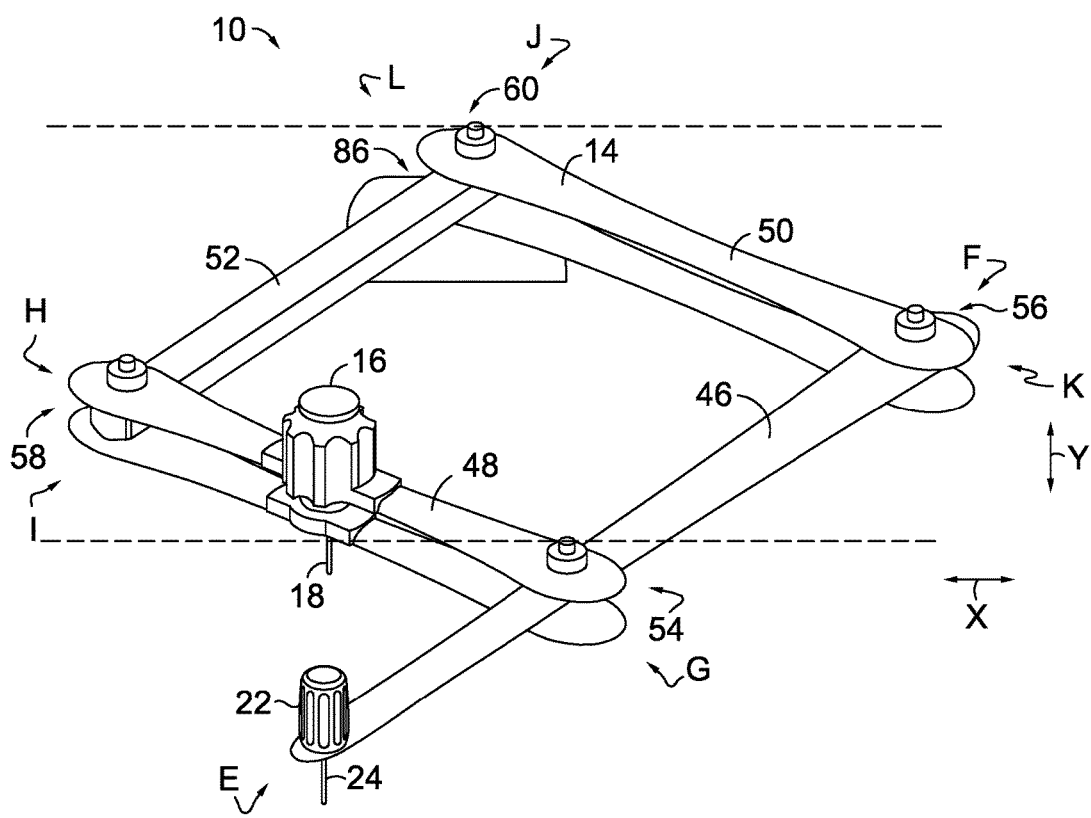
FIG. 2B is a top, perspective view of a portion of the crayon carving device of FIG. 1, in accordance with embodiments of the disclosure.
Figure 3:
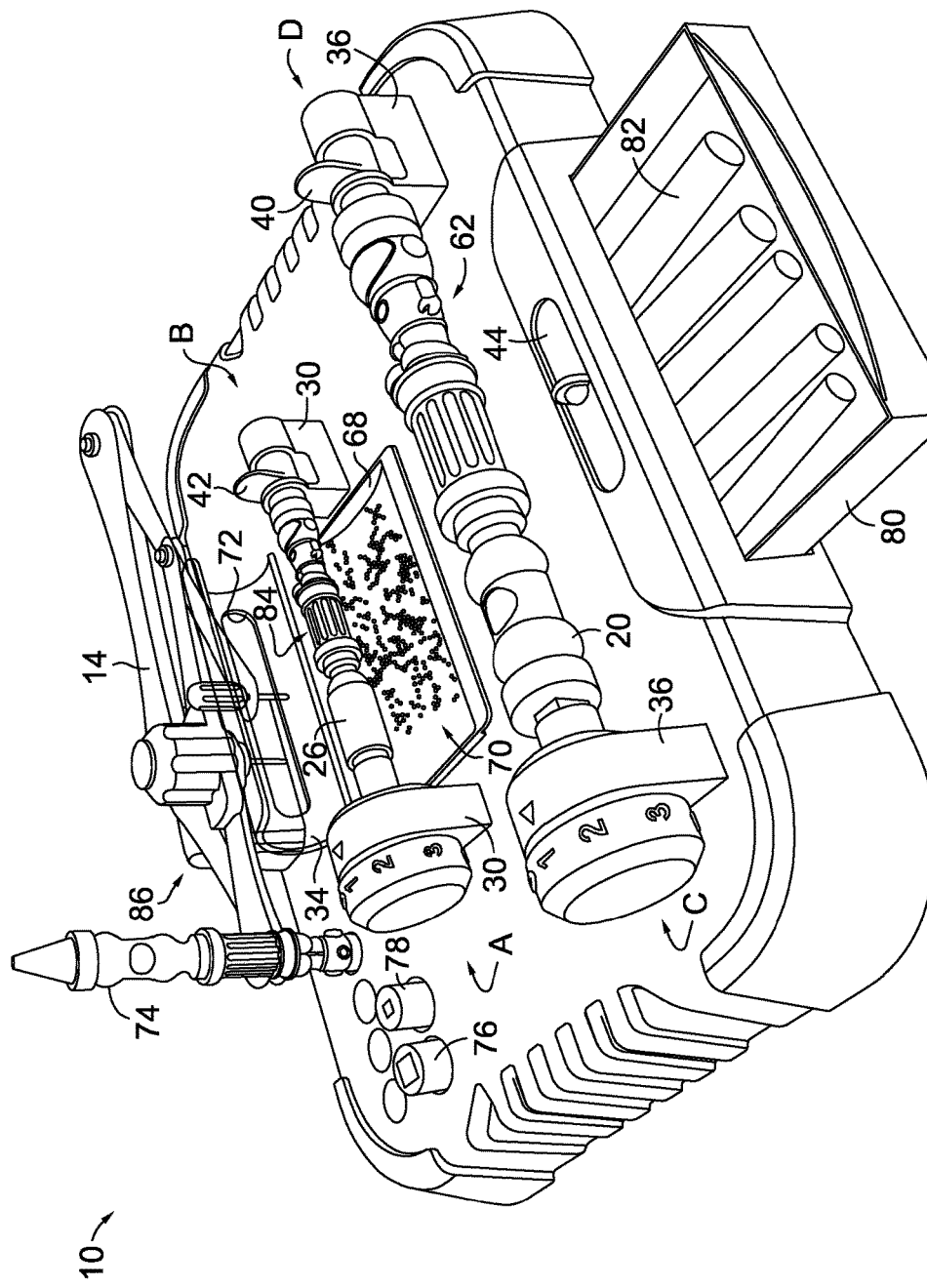
FIG. 3 is a front, perspective view of the crayon carving device of FIG. 1 in a second position, in accordance with embodiments of the disclosure.

Using the crayon carving device 10, in the exemplary embodiment of FIGS. 1-3, a carved surface 84 may be created on the exterior of the crayon body 26. In some embodiments, a pivoting mount 86 is used to secure the pantograph armature 14 to the base 12, providing for shifting of both the first support arm 50 and the second support arm 52 with respect to the base 12. As shown in FIG. 2A, the 3-D guide carvings 66 directly correspond to the 3-D guide surface 64 of the guide template 20, based on the orientation of both the crayon positioner 28, the guide template 20, the guide tip 24, and the drill bit 18. Accordingly, the first end A and second end B of the crayon positioner 28 are oriented on an axis that is parallel to the axis between the first end C and the second end D of the guide template 20.

As further shown in FIG. 2B, the pantograph armature 14 may expand or contract to direct travel of both the guide tip 24 and the drill bit 18 based on the orientation of a first end E and a second end F of the guide tip arm 46, a first end G and a second end H of the drive shaft arm 48, a first end I and a second end J of the second support arm 52, and the first end K and the second end L of the first support arm 50. In embodiments, travel of the cutter guide 22 and/or guide tip 24 along the x and y axis shown in FIG. 2B provides for parallel shifting between opposing sides of the pantograph armature 14, as well as coordinated travel of the guide tip 24 and the drill bit 18 to generate proportionate carvings on a crayon surface. As such, in some embodiments, the pantograph armature 14 includes multiple arms for compressing and extending in an accordion-like fashion.

In FIG. 3, the pantograph armature 14 is shown in a collapsed position, such that the crayon body 26 may be accessed by a user after carving. In some embodiments, the crayon body 26 may be removed from the crayon positioner 28 using the crayon release tab 42. Further, a different carving totem, such as a different guide template 20, may be coupled to the crayon carving device 10 using the template release tab 40 that is biased against the exemplary guide template 20.

Figure 4:
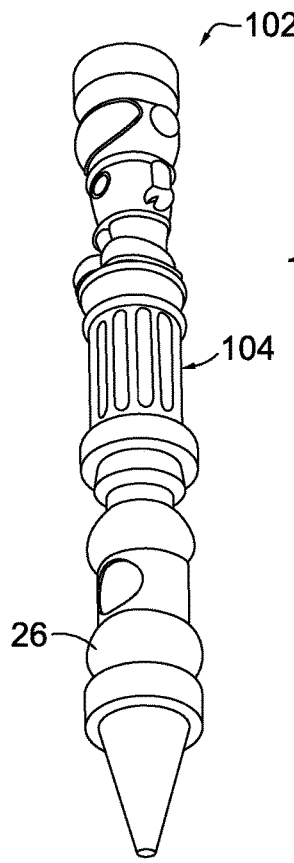
FIG. 4 is a front, perspective view of a carved crayon body, in accordance with embodiments of the disclosure.
Figure 5:
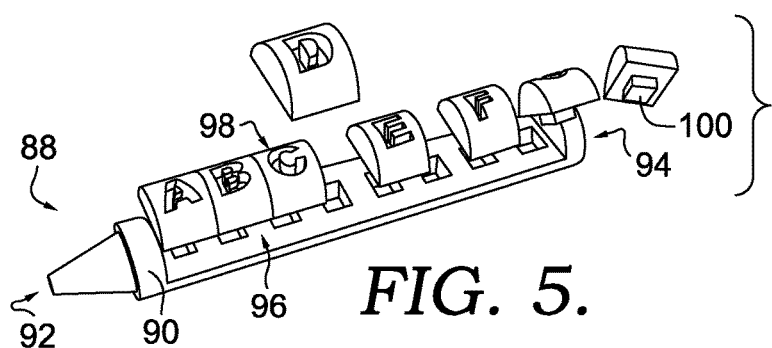
FIG. 5 is a side, perspective view of a custom guide template, in accordance with embodiments of the disclosure.
Figure 6:
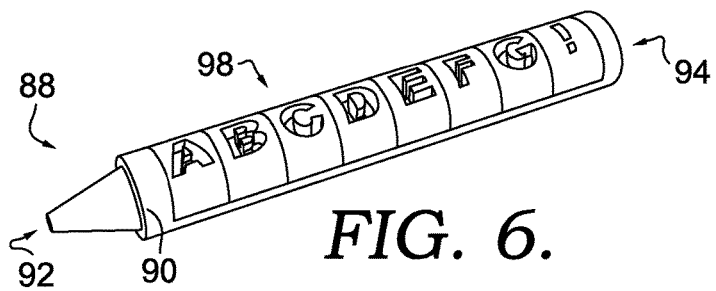
FIG. 6 is a side, perspective view of the custom guide template of FIG. 5, in accordance with an aspect of the disclosure.

In the example of FIG. 4, a carved crayon body 102 includes a crayon body 26 having a 3-D carved surface 104, which was created based on contact from a drill bit 18, as determined based on a position of the guide tip 24. In FIGS. 5-6, the movement of the guide tip 24 may be determined based on a custom guide template 88 that includes a template base 90, a first end 92, a second end 94, a coupling surface 96, carving bucks 98, and coupling mechanisms 100. In the exemplary embodiment, the carving bucks 98 may be interchanged and/or manipulated to provide any desired content for tracing, such as a series of letters or shapes. As such, based on the coupling mechanism 100 on the bottom side of each carving buck 98, a top side of the carving buck 98 may be traced by the guide tip 24 during carving.

With reference now to FIGS. 7-12, an exemplary embodiment of a crayon carving device 106 is provided. The crayon carving device 106 includes a base 108, a cage 110, a top 112, a bottom 114, a front 116, a back 118, a pantograph armature 120, a guide tip arm 122, a drive shaft arm 124, a first support arm 126, a second support arm 128, and a pivoting mount 130. In some embodiments, the pantograph armature 120 includes a first joint 132, a second joint 134, a third joint 136, and a fourth joint 138 where moveable features of the pantograph armature 120 are coupled. Additionally, the crayon carving device 106 includes a crayon positioner 140, a protective shield 142 with an opening 144, a tension tab 146 for coupling and decoupling a crayon body from the crayon positioner 140, a guide tab 148 for maneuvering the guide tip arm 122 (and correspondingly maneuvering both the guide tip 150 and the motorized drill and/or motorized stylus 180).

Figure 7:
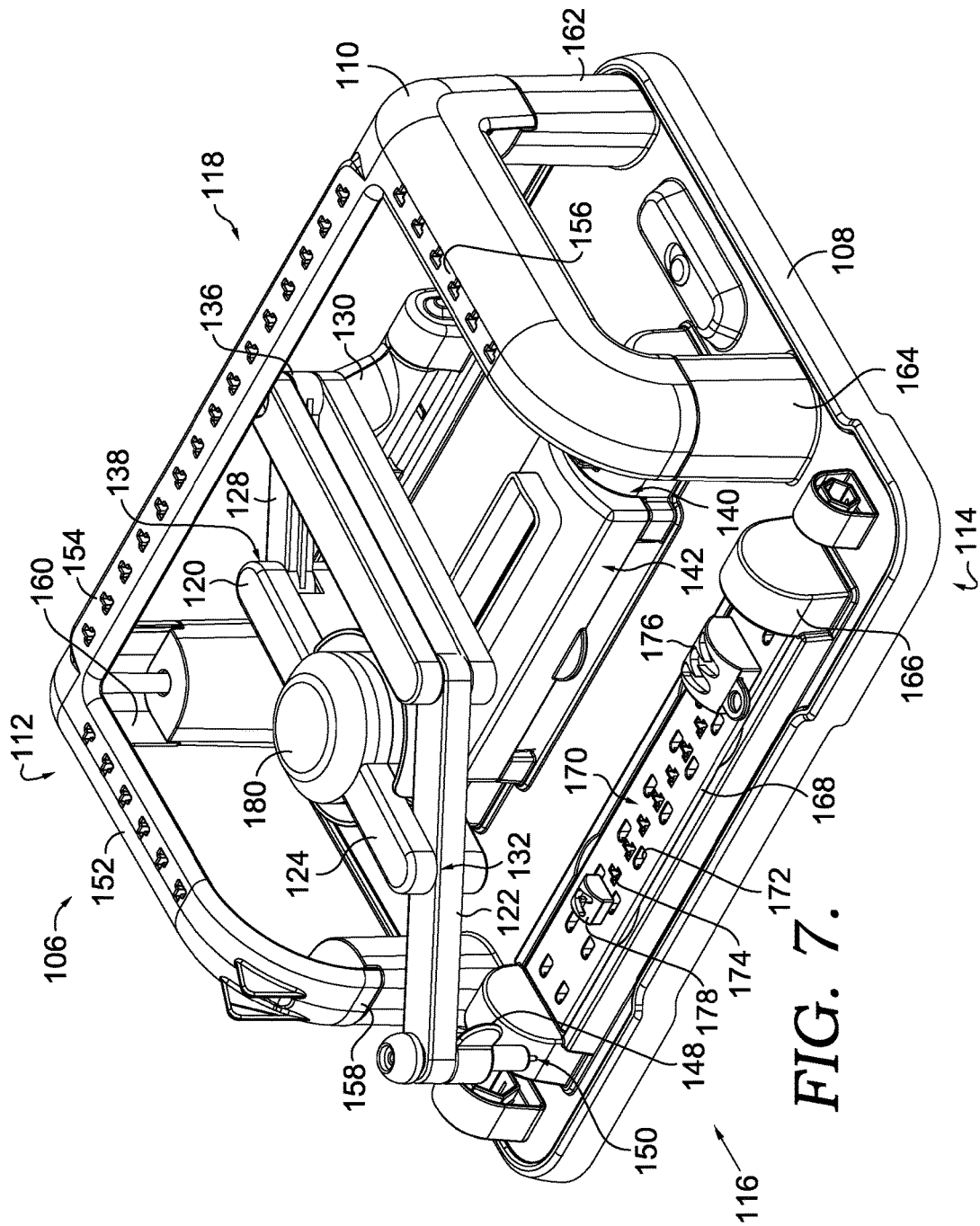
FIG. 7 is a top, perspective view of a crayon carving device, in accordance with embodiments of the disclosure.
Figure 8:
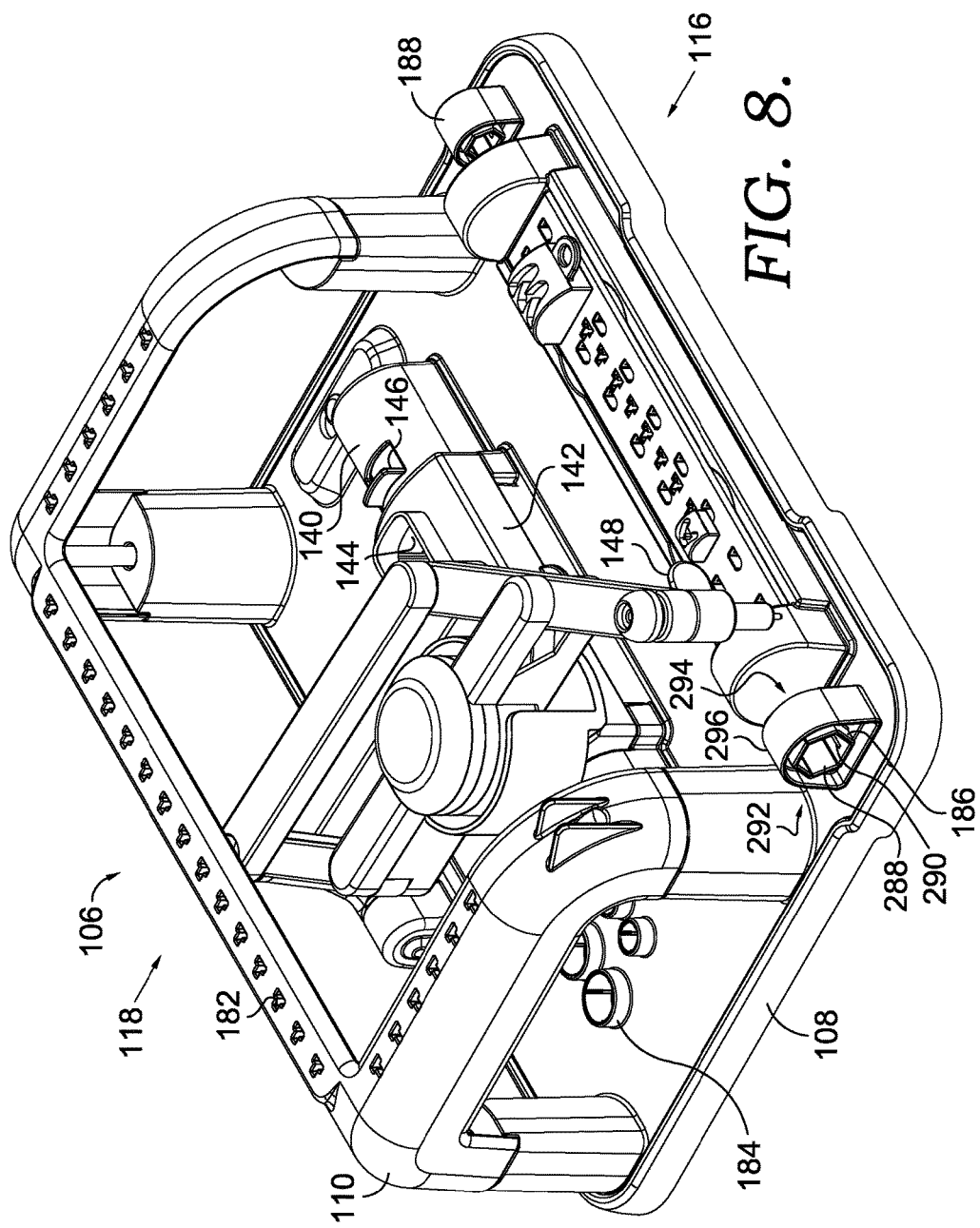
FIG. 8 is a top, perspective view of the crayon carving device of FIG. 7, in accordance with embodiments of the disclosure.
Figure 9:
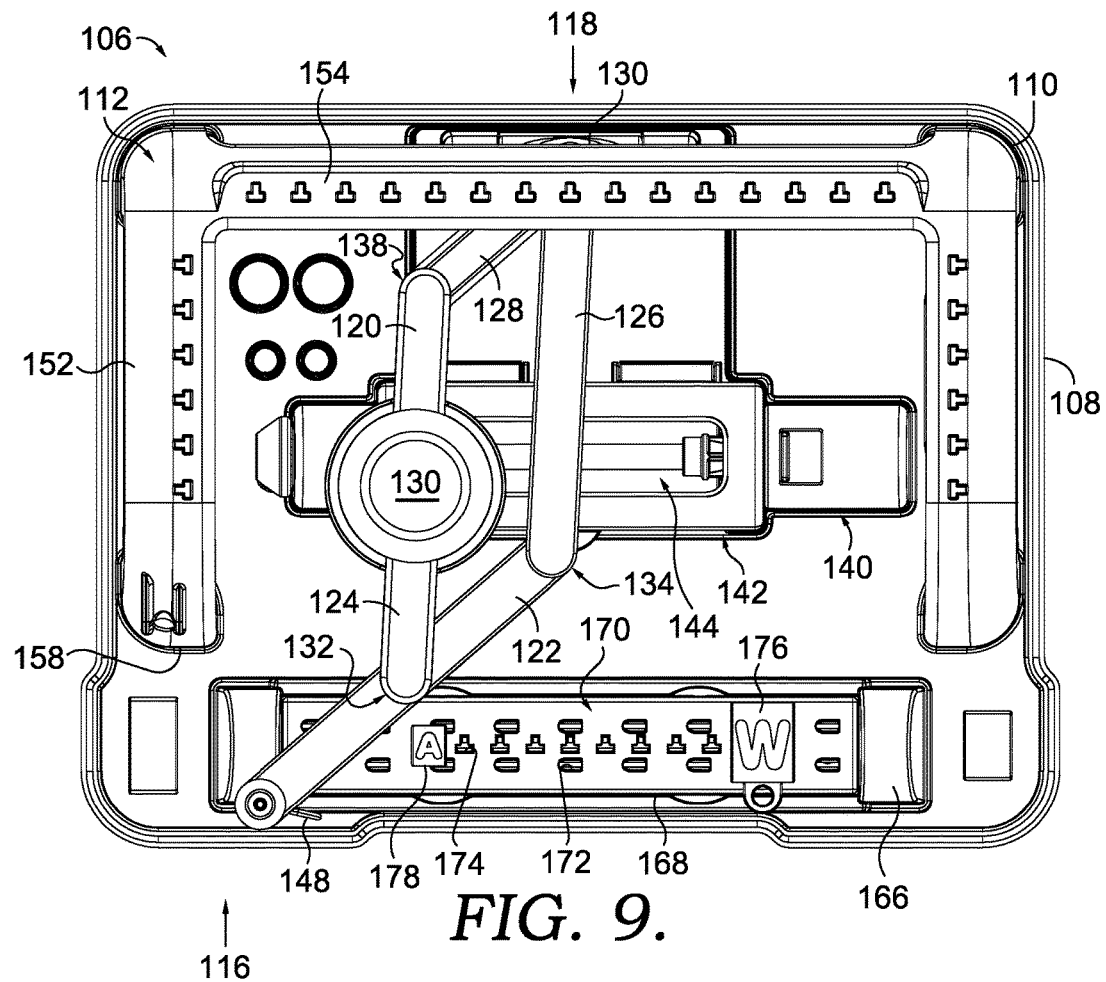
FIG. 9 is a top view of the crayon carving device of FIG. 7, in accordance with embodiments of the disclosure.
Figure 10:
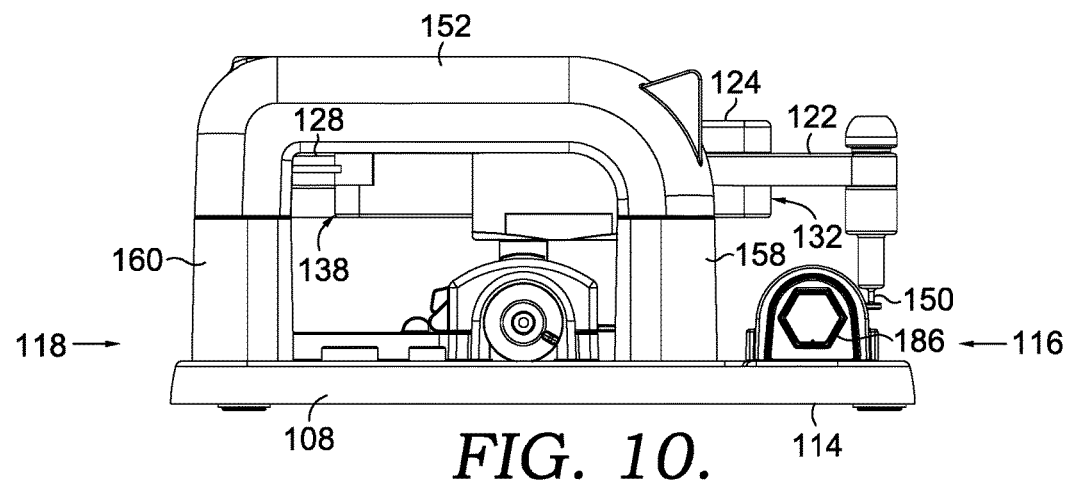
FIG. 10 is a side view of the crayon carving device of FIG. 7, in accordance with embodiments of the disclosure.
Figure 11:
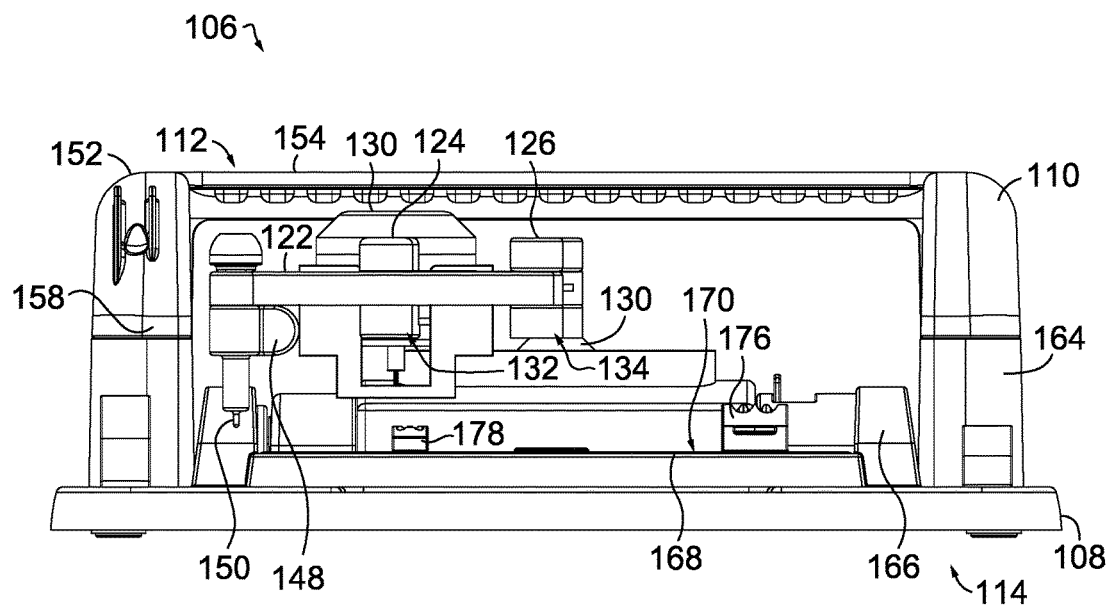
FIG. 11 is a front view of the crayon carving device of FIG. 7, in accordance with embodiments of the disclosure.
Figure 12:
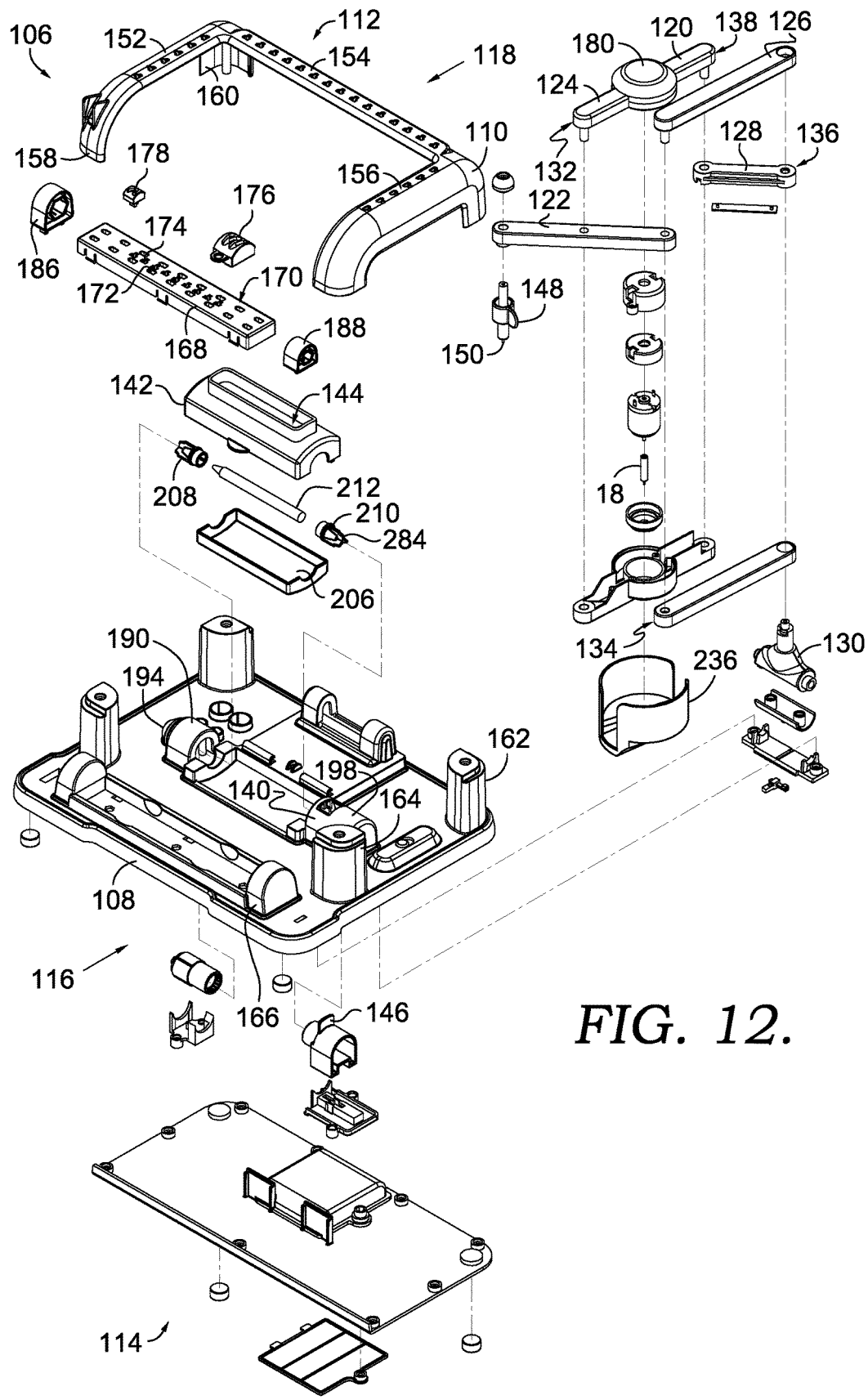
FIG. 12 is an exploded view of various components of the crayon carving device of FIG. 7, in accordance with embodiments of the disclosure.

As shown in the example of FIGS. 7-9, the cage 110 coupled to the base 108 may include a left side 152, a back side 154, a right side 156, a first support 158, a second support 160, a third support 162, and a fourth support 164, which collectively engage and/or surround at least a portion of the carving mechanisms and positioners of the crayon carving device 106. Additionally, the crayon carving device 106 includes a bridge positioner 166 that may be used to secure the bridge template 168, a top surface 170 of the bridge template 168 that may include a plurality of paired openings 172 and cross-shaped openings 174 for securing one or more of the large carving bucks 176 and/or small carving bucks 178. As will be understood, the universal bridge template 168 depicted in the embodiments may be used to secure one or more large carving bucks 176 and/or small carving bucks 178 based on one or more features on a bottom surface of each of the carving bucks, such as the exemplary coupling mechanism 100 shown in FIG. 5. In some embodiments, the pantograph armature 120 may be used to trace the guide tip 150 of the guide tip arm 122 along one or more features of one or more carving bucks (e.g., the large carving bucks 176 and/or small carving bucks 178) to generate a corresponding, synchronized carving on the outer surface of a crayon body 26. In one aspect, a crayon positioner 140 may be used to secure a large and/or "jumbo" crayon body 26 in a particular stationary orientation with respect to the bridge template 168 that secures one or more of the large carving bucks 176. In a further embodiment, the crayon positioner 140 may be used to secure a small and/or "regular" crayon body 26 in a particular stationary orientation with respect to the bridge template 168 that secures one or more of the small carving bucks 176. In one aspect, the crayon positioner 140 may be coupled to an adapter or additional feature for engaging the shape of the smaller, "regular" crayon, such as the small crayon tip adapter 78 of FIG. 3.

In another embodiment of the invention, at least a portion of the crayon positioner 140 may be configured to mate to a size of a larger, "jumbo" crayon without the use of an adapter (e.g., large tip adapter 76) based on an interior surface of at least one end of the crayon positioner 140. Accordingly, in one embodiment, at least one end of the crayon positioner 140 may be coupled to an adapter (e.g., a small crayon tip adapter 78) to enable the crayon positioner 140 to secure a smaller crayon into a stationary position for carving. As such, both large and small crayons may be secured in a stationary position by a single crayon positioner 140 having a single tension release tab 146.

With continued reference to FIGS. 7-12, in some aspects, the motorized drill 180 may be used to automatically carve an exterior surface of the crayon body secured by the crayon positioner 140 based on tracing of the surface of the corresponding carving bucks coupled to the stationary bridge template 168. In further aspects, the crayon carving device 106 includes a series of storage detents 182 on at least a portion of the base 108 and/or cage 110 for securing one or more carving bucks based on mating the storage detents 182 to the coupling mechanism 100 of each carving buck. Further, the crayon carving device 106 may include one or more holders 184 on the base 108 for storing small or large crayon bodies, and one or more wrapper releases for removing a crayon wrapper from a crayon body prior to carving, such as a large wrapper release 186 and/or a small wrapper release 188. In some aspects, the large wrapper release 186 and/or the small wrapper release 188 include an interior flange for contacting at least a portion of the crayon's exterior wrapper (e.g., a paper crayon wrapper affixed to an exterior of the crayon body) and cutting and/or releasing the wrapper so that the drill bit of the motorized drill 180 may directly contact the surface of the crayon body during carving.

In one embodiment of the invention, a crayon carving device includes a base coupled to 1) a pantograph armature with a motorized drive shaft and a guide tip, 2) a crayon positioner that secures a crayon body in a stationary position, and 3) a guide template coupled to the base in a position parallel to the crayon positioner and in relation to the pantograph armature such that motion of the guide tip along the guide template corresponds to carving along the crayon body. In some aspects, the guide tip may trace multiple surfaces of multiple different carving bucks to generate multiple different types of carvings and/or markings on the surface of the crayon body. The base of the crayon carving device may include a support cage that encloses at least a portion of the pantograph armature to protect the motorized drill and/or drill tip from damage, such as by dropping of the crayon carving device.

Additionally, the guide tip and drive shaft are coupled to the pantograph armature with spacing/positioning that facilitates a particular, proportionate movement for carving both small and large crayon bodies using both small and large carving bucks. In some aspects, one or more adapters may be coupled to the crayon positioner and/or crayon bodies to facilitate the carving of both sizes of crayon bodies, such as indicated in FIG. 24. In one embodiment of the invention, a guide template may include a stationary mounting bridge for coupling multiple carving bucks, both large and small, and multiple different carving totems providing a 3-D tracing surface that guide the proportional carving of a crayon body.

In further embodiments of the invention, a crayon carving device includes a universal bridge template for securing multiple carving bucks of different sizes, including different surface features for tracing with a guide tip. Further, the crayon positioner includes multiple features for coupling to multiple sizes of crayons corresponding to the carving templates, bucks, totems, and or other carving guides. Additionally, while multiple different sizes of crayons may be carved based on contact with the drill tip of the motorized drill, the tip of the motorized drill may remain protected and/or obstructed from access by a user during drilling. As such, the protective shield may prevent a user from contacting the drill tip while a crayon is being carved.

In another aspect of the invention, a safety switch may be provided that enables or disables power to the motorized drill based on the position of the pantograph armature. For example, when the pantograph armature is fully extended beyond the range of the bridge template, the drill may remain inactive and/or without power. In another example, when the pantograph armature is raised vertically to a particular distance above the base, the motor may again cease. In another embodiment, a contact and/or pressure indicator may be coupled to the drill tip that provides an indication to the motor when the pantograph armature is extended or contracted, such that the motor turns off when the armature is returned to a resting position (e.g., a stationary resting mount).

Power may be provided to the device from one or more different sources. In one example, a power source for the motorized drill may include a battery, an electrical connection, a wireless connection, a remote control connection, a USB connection, a rechargeable battery connection, and the like. In further aspects, one or more switches and/or electrical connections may be provided to enable or disable one or more features of the crayon carving mechanism. For example, a drill bit of the motorized drill may be enabled upon particular positioning of the drill bit with respect to the crayon body. In further aspects, contact of the drill bit with a surface other than that of the crayon body may disengage the motorized drill, thereby preventing carving of surfaces other than the crayon body. Accordingly, one or more switches may be coupled to one or more features of the crayon-carving device for enabling or disabling one or more features during, before, and/or after crayon carving.

Additional embodiments of the invention include one or more accessories or other features for use with the crayon carving mechanism. For example, as shown in FIG. 25, a debris-removal device 400 may be provided for removing portions of crayon carvings/debris from the surface of a carved crayon and/or a surface of the base. In one embodiment, a debris-removal device may include a brush tool having a bristle head, such as a paintbrush, a makeup brush, a powder brush, a wide bristle paint brush, a stiff bristle paintbrush, a stencil brush, and the like. The base may include one or more features for removably coupling to the debris-removal device, such as a clip mechanism for temporarily securing a paint brush device when not in use.

As will be understood, embodiments of the invention may include a variety of different numbers and/or types of template pieces. For example, uppercase letters, lowercase letters, letters in a variety of fonts and/or styles, icons, portions of icons, portions of letters, etc. may be included on one or more different templates for use with the crayon-carving device. In some aspects, a storage location on the base may be provided for securing one or more of the template pieces. Additionally, the template pieces and/or "bucks" may be coupled to one or more adjacent template pieces/bucks for connecting a particular carving pattern. In that example, neighboring bucks may be coupled together to link a design and provide a continuous pattern for carving along a crayon.

Figure 13:
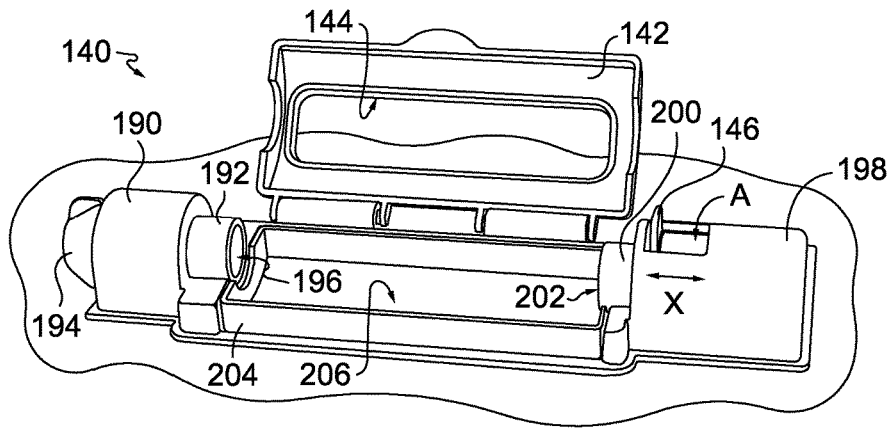
FIG. 13 is an enlarged, perspective view of a crayon positioning mechanism, in accordance with embodiments of the disclosure.

Turning next to FIGS. 13-17, an exemplary crayon positioning mechanism 140 may include a first end 190 with a first coupling feature 192 having a first interior retention feature 196, a position adjustment mechanism 194 in a first position, a second end 198 with a tension tab 146 in an undepressed position A (as shown in FIG. 13) and a second coupling feature 200 having a second interior retention feature 202, and a protective shield 142 having an opening 144 adjacent a crayon carving tray 204 having a tray interior 206. In some embodiments, the positioning mechanism 140 may be used to secure a crayon body in a stationary position along the x axis such that a carving mechanism accessing a crayon body via the opening 144 in the protective shield 142 may apply a threshold amount of force to the crayon body without the crayon body shifting, moving, and/or rotating away from a carving feature, such as a drill bit.

Figure 14:
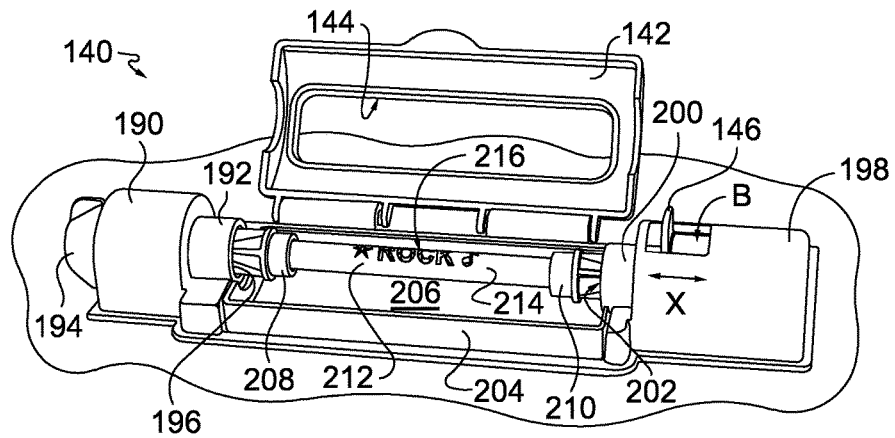
FIG. 14 is an enlarged, perspective view of a crayon positioning mechanism, in accordance with embodiments of the disclosure.

In FIG. 14, with the tension tab 146 in a depressed position B, a crayon body 212 may be secured between the first end 190 and the second end 198 of the crayon positioning mechanism 140 based on one or more adapter features securing the crayon body 212 along the x axis. In one example, an adapter 208 may be coupled to the crayon body 212 and the first interior retention feature 196 of the first coupling feature 192. In further aspects, an adapter 210 may be coupled to the crayon body 212 and the second interior retention feature 202 of the second coupling feature 200. Providing a stabilizing surface for preventing rotation and/or shifting of the crayon body 212, one or more features on an external surface of the adapter 208 and/or adapter 210 may be configured to interact with at least a portion of the first interior retention feature 196 and/or second interior retention feature 210. As such, in some aspects, one or more adapter mechanisms may be utilized to secure a crayon body 12 with respect to one or both ends of the crayon positioning mechanism 140, as the exterior features of a universal adapter mechanism may be configured to fit within either the first coupling feature 192 or the second coupling feature 210.

Figure 15:
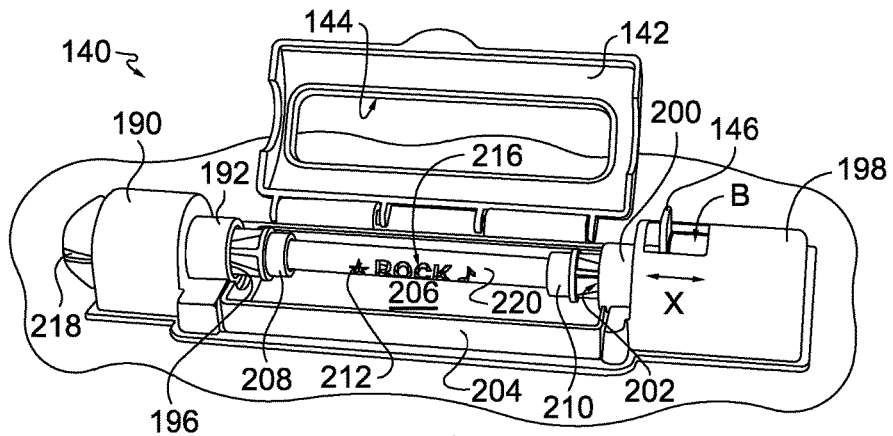
FIG. 15 is an enlarged, perspective view of a crayon positioning mechanism, in accordance with embodiments of the disclosure.

Crayon positioning component 140 may further be utilized to carve additional portions of the crayon body 212 based on rotation of the position adjustment mechanism 218 into a second position of FIG. 15. As such, in the first position of FIG. 14, the crayon body 212 having a first surface orientation 214 may be carved with markings 216. In FIG. 15, based on rotation of the second position adjustment mechanism 218, a different portion of the crayon body may be accessed via the opening 144 of the protective shield 142, such as the surface of the crayon body 212 corresponding to the second surface orientation 220. In some aspects, the position adjustment mechanism may move from the first position 194 to the second position 218 based on secured position between one of multiple predefined rotational positions. In one example, the position adjustment mechanism may adjust between one of four positions, providing access from four different locations with respect to the surface of the crayon body.

Figure 16:
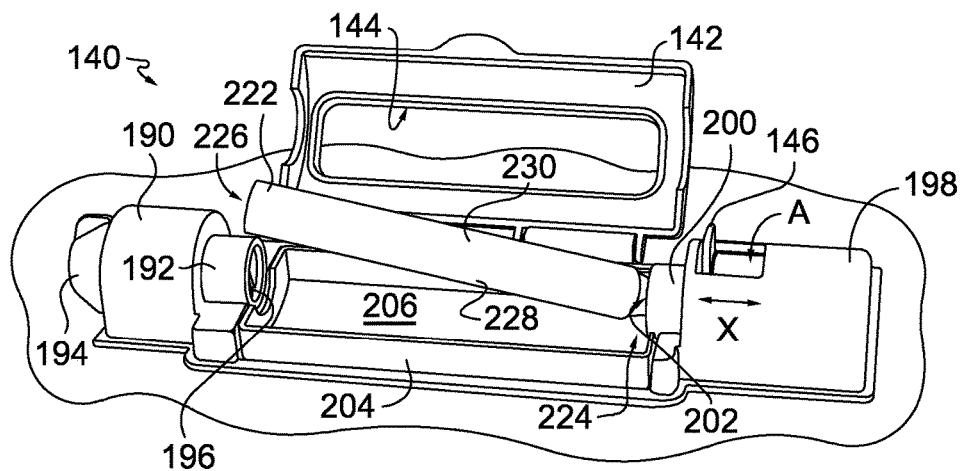
FIG. 16 is an enlarged, perspective view of a crayon positioning mechanism, in accordance with embodiments of the disclosure.
Figure 17:
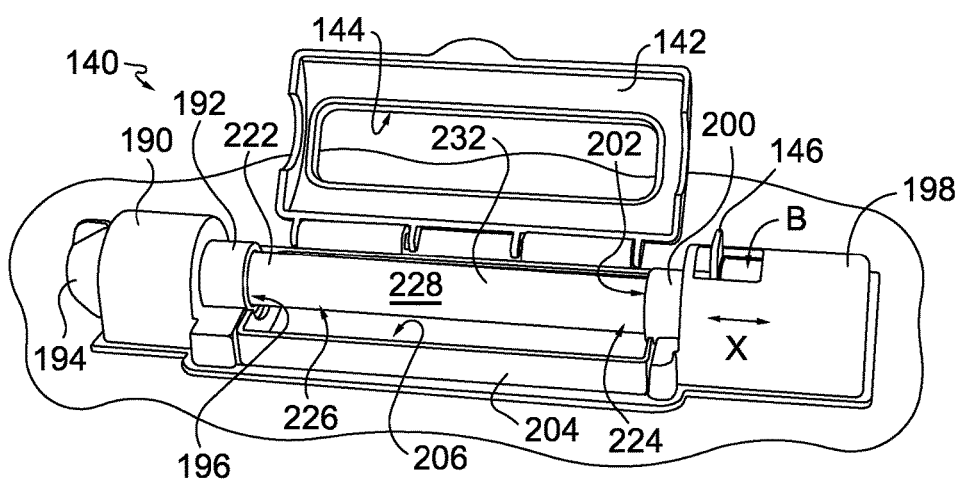
FIG. 17 is an enlarged, perspective view of a crayon positioning mechanism, in accordance with embodiments of the disclosure.

With reference to FIGS. 16-17, the crayon positioning mechanism 140 may further include one or more features configured to secure a larger-sized crayon along the x axis, such as a jumbo-sized crayon body 222, without the use of one or more adapter features. In this example, the crayon positioning mechanism 140 may be configured to receive a first end 224 of the crayon body 222 at the second coupling feature 200, in the loading position 230, and upon depressing the tension tab 146 from the undepressed position A to the depressed position B (i.e., moving the second coupling feature 200 from a first position to a second position to facilitate inserting the crayon body 222), the first coupling feature 192 may be configured to receive the second end 226 of the crayon body 222 in the stationary position 232. In this example, the crayon surface 228 of the crayon body 222 may be accessed via the same opening 144 in the protective shield 142 as was utilized for accessing the smaller crayon body 212. Additionally, the removable and/or universal adapter features may be used to secure both a smaller crayon body 212 and a larger crayon body 222 within the crayon positioning mechanism 140, stabilizing the body along the x axis to prevent rotation, shifting, or movement during carving, according to one embodiment of the invention.

Figure 18:
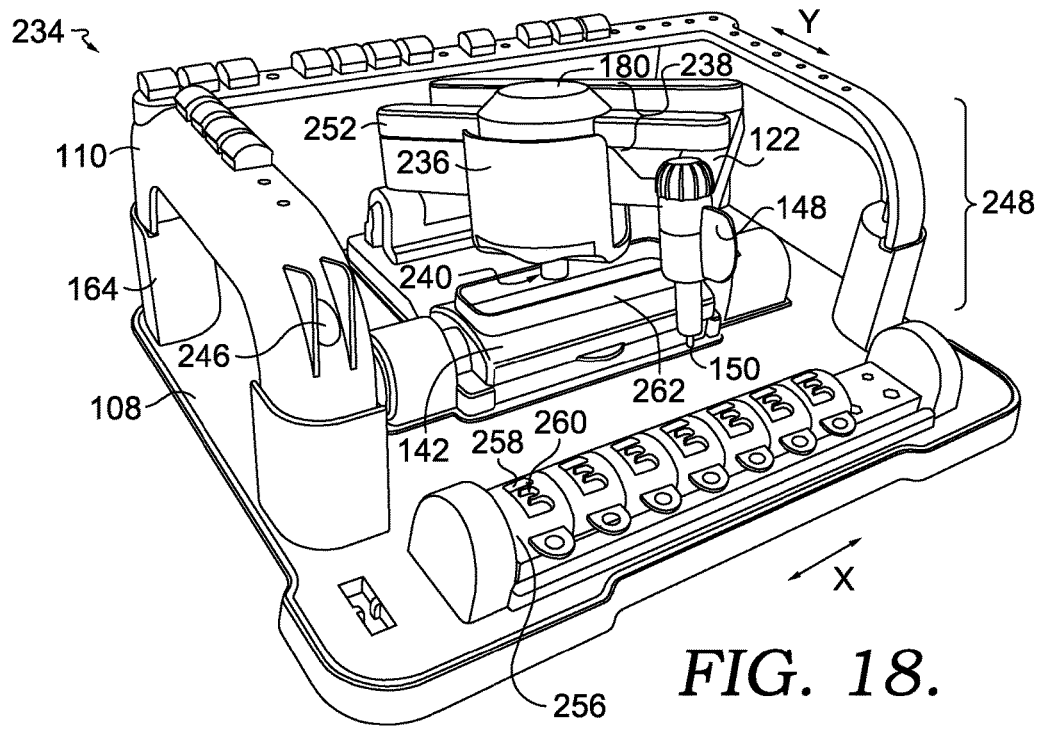
FIG. 18 is a top, perspective view of a crayon carving device, in accordance with embodiments of the disclosure.
Figure 19:
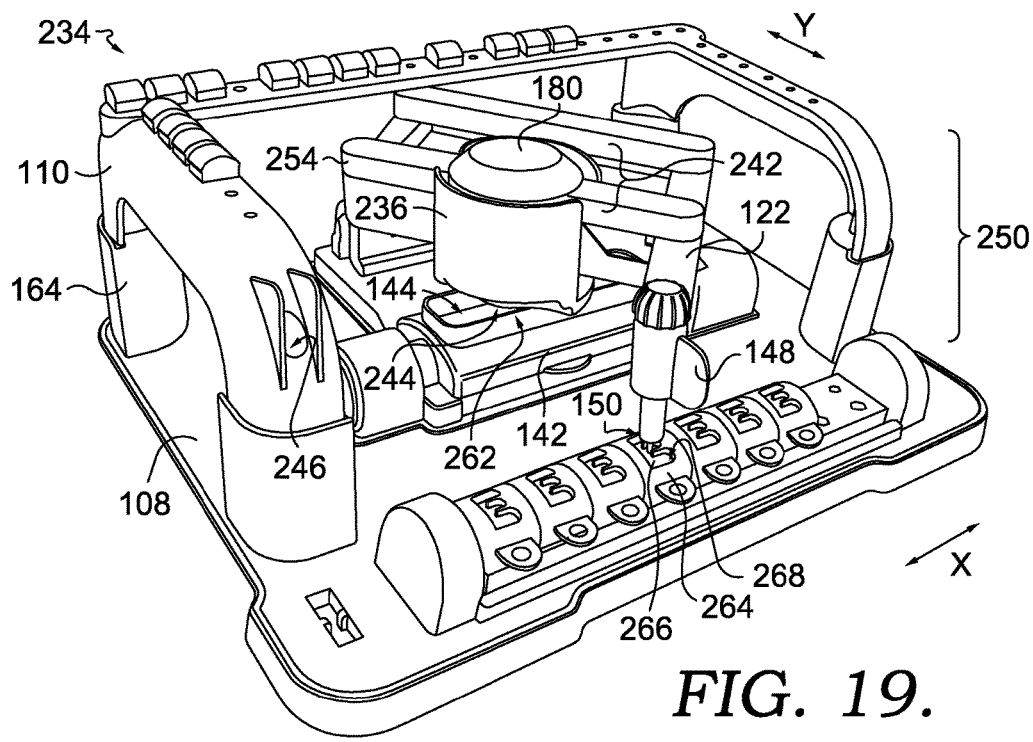
FIG. 19 is a top, perspective view of a crayon carving device, in accordance with embodiments of the disclosure.

In the exemplary embodiment of FIG. 18, a crayon carving device 234 includes a motorized stylus shield 236 that secures one or more features of the motorized stylus 180 at a first height 248 based at least in part on a first motor-coverage position 238, a first pantograph position 252, and a first drill exposure position 240. As such, the first drill exposure position 240 with respect to the flange 262 on the protective shield 142 may provide an indication to at least one power source of the crayon carving device 234 that the motorized stylus 180 is in a non-carving position (i.e., a position corresponding to the first height 248 of the pantograph mechanism). As shown in FIG. 19, once shifted into a position at a second height 250, the stylus shield 236 may shift into a depressed position based at lest in part on the second motor-coverage position 242, the second pantograph position 254, and the second drill exposure position 244. In this aspect, the second drill exposure position 244 with respect to the flange 262 may provide an indication to at least one power source associated with the crayon carving device 234 that the carving mechanism of the motorized stylus are in a carving position (i.e., a position corresponding to the second height 250 of the pantograph mechanism). As such, depression of the stylus shield 236 may be used to turn off a drill motor when the pantograph mechanism is not in a position to carve a crayon, and may turn on when the guide tip 150 becomes positioned with respect to a corresponding guide template to direct carving.

With continued reference to FIGS. 18-19, one or multiple template features may be provided for carving a crayon body, such as the first template 256 having a first shape 258 with a first depth 260, and a second template 264 with a second shape 266 and a second depth 268. As such, based on user interaction with the guide features of the pantograph armature, and hand-manipulated guidance with respect to the various features having various shapes and depths on the guide template(s), a parallel positioning of the carving mechanism may generate various positions and various carved features of the secured crayon body, with a responsive on-off safety mechanism that may include activating or inactivating the drilling features of the crayon carving device based on raising or lowering of the pantograph mechanism, position of the user's guide tip, spacing of the drill bit away from the intended crayon surface, and the like.

Figure 20:
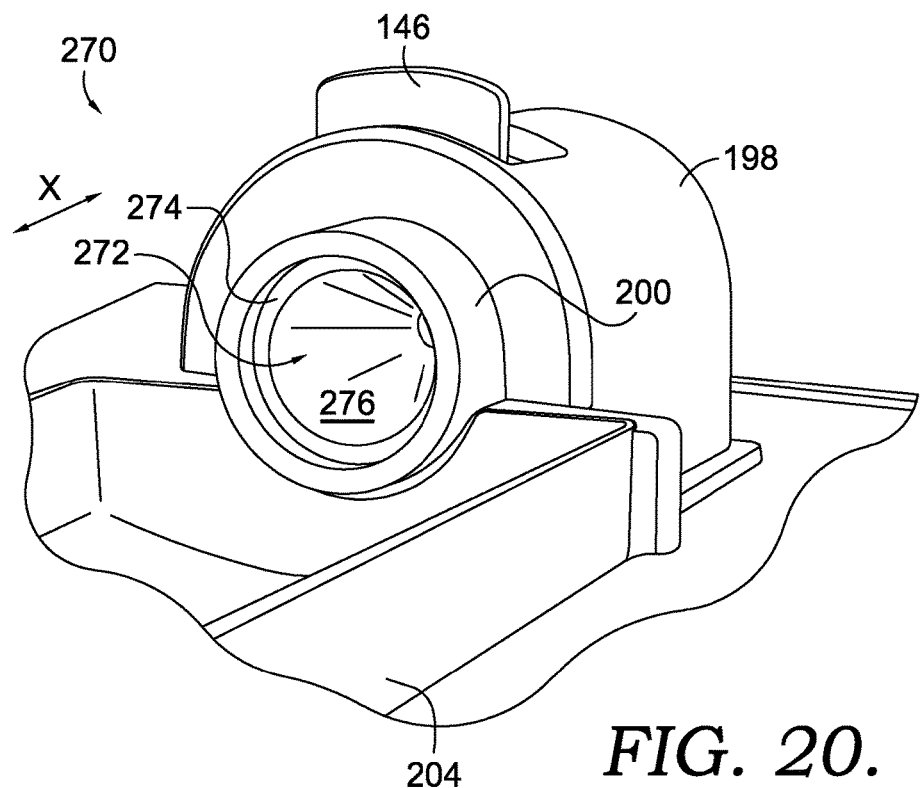
FIG. 20 is an enlarged, perspective view of a feature of a crayon positioning mechanism, in accordance with embodiments of the disclosure.
Figure 21:
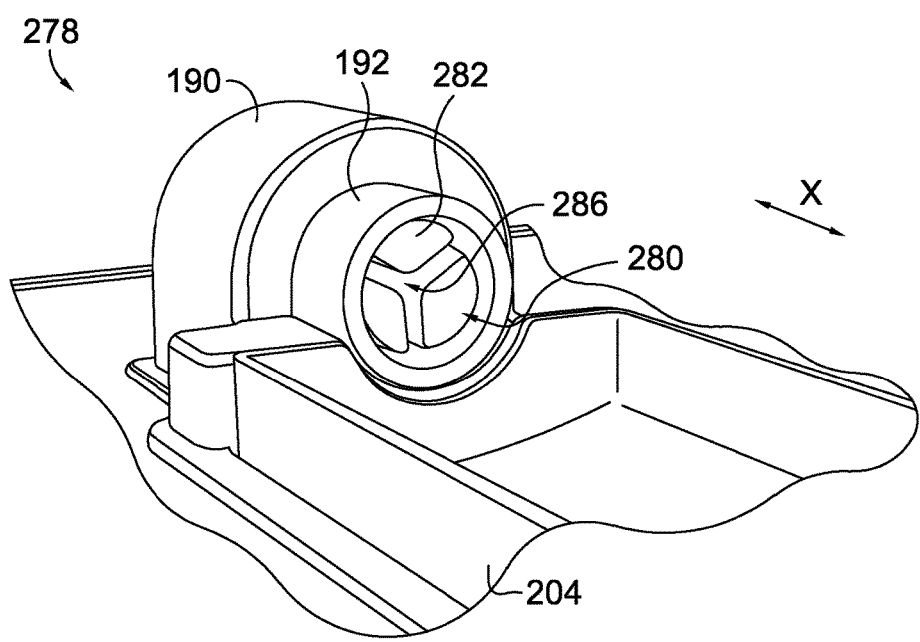
FIG. 21 is an enlarged, perspective view of a feature of a crayon positioning mechanism, in accordance with embodiments of the disclosure.

As shown in FIGS. 20-21, the crayon coupling mechanism 270 may include a conical interior 272 having at least one stepped feature 274 for securing at least one end of a crayon body. For example, the conical interior 272 and/or stepped feature 274 may be configured to secure a crayon tip based on the tapered surface 276. Similarly, the crayon coupling mechanism 278 may include a shaped interior 280 configured to secure at least one end of a crayon body. To stabilize the crayon body, the shaped interior 280 may include one or more grip features 282 configured to couple to at least a portion of a crayon body and/or at least a portion of one or more flanges 284 on an exterior of an adapter (such as adapters 208 and 210) based on one or more adapter plug-in spacers 286.

Figure 22:
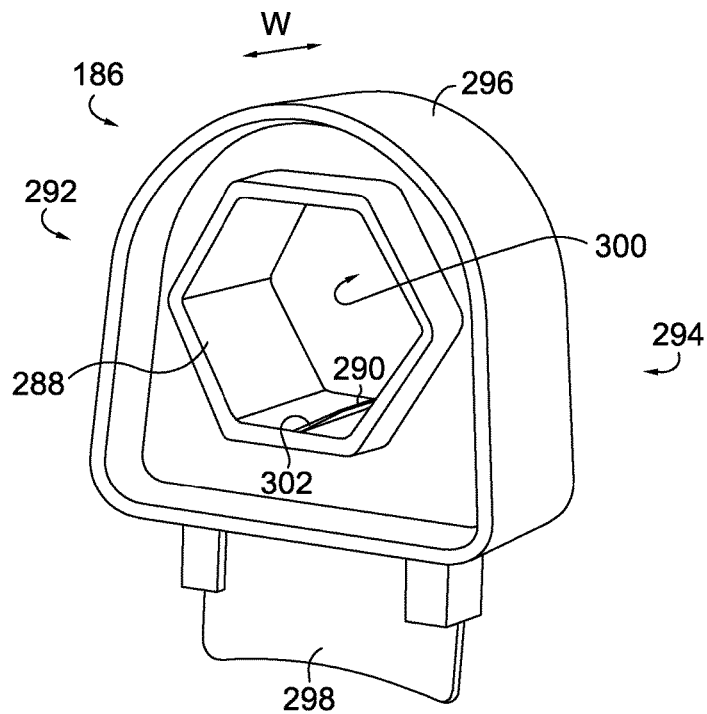
FIG. 22 is a perspective view of a crayon wrapper release mechanism, in accordance with embodiments of the disclosure.
Figure 23:
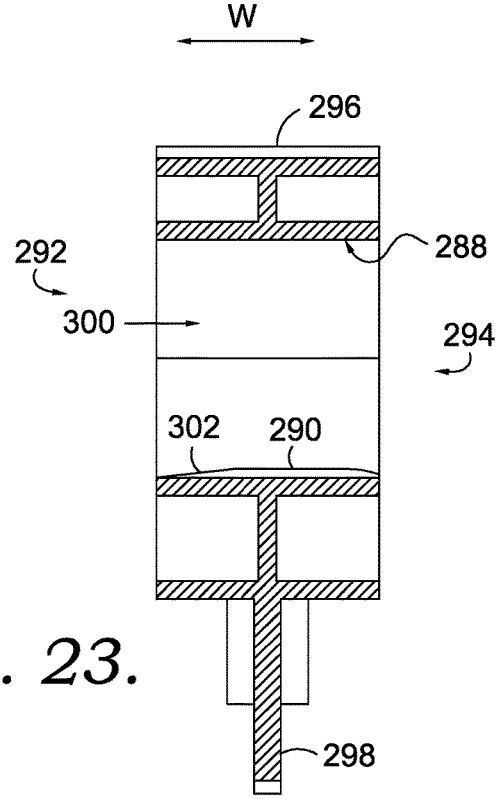
FIG. 23 is a side, cross-sectional view of the crayon wrapper release mechanism of FIG. 22, in accordance with embodiments of the disclosure.

With reference finally to FIGS. 22-23, an exemplary wrapper removal mechanism 186 may include a shaped interior 288 configured to receive a wrapped crayon body through an aperture 300, a gripping outer surface 296, a gripping lower edge 298, a rib feature 290 having an angled surface 302. In some aspects, a crayon having a wrapper on an outer surface may be passed through the wrapper removal mechanism 186 from a first end 292 to a second end 294, and vice versa, such that the angled surface 302 engages at least a portion of the crayon wrapper for removal. As such, upon pulling a wrapped crayon through the wrapper removal mechanism 186, without directly accessing the angled surface 302 and/or rib feature 290, the user may disengage the wrapper from the outer surface of the crayon body, in preparation for crayon body carving.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A crayon carving device comprising:
a base;
a pantograph armature coupled to the base, the pantograph armature comprising a motorized stylus and a cutter guide;
at least one crayon positioner configured to secure at least one crayon body; and
at least one guide template, wherein the at least one guide template comprises a plurality of carving bucks and a plurality of openings, the openings each configured to mate to and receive a respective one of the carving bucks therein, wherein each carving buck comprises a template surface commensurate in size to at least a portion to be carved of an outer surface of a crayon body;
wherein the motorized stylus is configured to alter at least one surface of the at least one crayon body secured by the at least one crayon positioner in response to interaction between the cutter guide and the at least one guide template.

2. The crayon carving device of claim 1, wherein the base comprises one or more cage supports configured to secure at least a portion of the pantograph armature.

3. The crayon carving device of claim 1, wherein the pantograph armature comprises:
   a cutter guide arm comprising a cutter guide arm first end, a cutter guide arm second end, and a cutter guide arm intermediate portion between the cutter guide arm first end and the cutter guide arm second end, wherein the cutter guide arm comprises a guide tip coupled to the cutter guide arm first end;
   a drive shaft arm comprising a drive shaft arm first end, a second drive shaft arm end, and a drive shaft arm intermediate portion between the drive shaft arm first end and the drive shaft arm second end, wherein the drive shaft arm comprises the motorized stylus, which motorized stylus is coupled to the intermediate portion of the drive shaft arm, wherein the drive shaft arm first end is coupled to the cutter guide arm intermediate portion at a first armature joint;
   a first support arm comprising a first support arm first end and a first support arm second end, wherein the first support arm first end is coupled to the second end of the drive shaft arm at a second armature joint; and
   a second support arm coupled to the first support arm second end at a third armature joint, and the second support arm being coupled to the cutter guide arm second end at a fourth armature joint.

4. The crayon carving device of claim 3, wherein movement of the guide tip corresponds to movement of the motorized stylus.

5. The crayon carving device of claim 3, wherein interaction between the cutter guide and the at least one guide template comprises interaction between the guide tip and at least a portion of the at least one guide template, and wherein the interaction between the guide tip and the at least a portion of the at least one guide template occurs at the same time as interaction between a drill bit of the motorized stylus and an outer surface of the at least one crayon body.

6. The crayon carving device of claim 1, wherein the at least one crayon positioner is configured to secure at least one crayon body having a first size, and further wherein the at least one crayon positioner is configured to secure at least one crayon body having a second size smaller than the first size.

7. The crayon carving device of claim 1, wherein the at least one guide template further comprises a mounting bridge configured to secure at least one of the carving bucks.

8. The crayon carving device of claim 7, wherein the mounting bridge is a stationary bridge comprising the plurality of openings.

9. The crayon carving device of claim 8, wherein the plurality of carving bucks comprises at least one carving buck of a first size commensurate in size to a crayon body having a first size, and wherein the plurality of carving bucks further comprises at least one carving buck of a second size commensurate in size to a crayon body having a second size.

10. The crayon carving device of claim 1, further comprising one or more of the following:
   at least one crayon wrapper remover mechanism;
   at least one crayon adapter commensurate to the second crayon size;
   at least one drill bit guard adjacent a crayon positioner;
   at least one guide tip coupled to the base; and
   at least one debris removal tool.

11. The crayon carving device of claim 1, wherein the plurality of carving bucks includes one or more of:
   a letter carving buck commensurate in size to one or more of a first crayon size and a second crayon size smaller than the first crayon size; and
   an icon carving buck commensurate in size to one or more of the first crayon size and the second crayon size smaller than the first crayon size.

12. A crayon carving device comprising:
   a base support;
   a tracing guide coupled to the base support, wherein the tracing guide comprises:
      (1) a guide tip; and
      (2) a drill tip separated a distance from the guide tip;
   the crayon carving device further comprising:
   a crayon positioner coupled to the base support at a first position;
   a mounting bridge coupled to the base support at a second position, and
   at least one template feature removably coupled to the mounting bridge, the at least one template feature comprising a plurality of carving bucks, wherein the mounting bridge comprises a plurality of openings each configured to mate to and receive therein a respective one of the plurality of carving bucks, wherein each of the plurality of carving bucks is commensurate to a crayon body size.

13. The device of claim 12, wherein the tracing guide comprises a pantograph armature configured to simultaneously adjust a position of the guide tip and the drill tip.

14. The device of claim 12, wherein the crayon positioner comprises a tensioning mechanism configured to secure and release at least one crayon body on at least one end of the at least one crayon body.

15. The device of claim 12, wherein the crayon positioner comprises:
   a first end comprising at least one feature configured to secure at least one end of at least one crayon body having a first size, and
   at least one removable adapter configured to secure at least one end of at least one crayon body having a second size, wherein the second size is different from the first size.

16. The device of claim 12, wherein, in response to contact between the guide tip and the at least one template feature, the drill tip is configured to alter at least one surface of at least one crayon body secured by the crayon positioner.

17. A crayon carving kit comprising:
   a crayon positioner configured to secure a crayon body at a first end and a second end of the crayon body, wherein the crayon positioner comprises:
      a tension release for coupling and decoupling the crayon body with the crayon positioner,
      a crayon stabilizer for securing a tip end of a crayon body having a first size, and
      a crayon adapter configured to secure a tip end of a crayon body having a second size that is smaller than the first size;
   the crayon carving kit further comprising:
   a carving template, said carving template comprising one or more of the following:
      at least one carving buck commensurate to a size of an exterior surface of the crayon body having a first size; and
      at least one carving buck commensurate to a size of an exterior surface of the crayon body having a second size; and
   the crayon carving kit further comprising:

a carving device comprising a drill tip and a carving guide, wherein the carving device is configured to remove at least a portion of an exterior surface of a crayon body secured by the crayon positioner based on 1) interaction between the carving guide and the carving template, and 2) interaction between the drill tip and the crayon body secured by the crayon positioner;

wherein the template comprises a plurality of openings each configured to mate to a respective one of the carving bucks, wherein the carving template further comprises one or more totems, each totem comprises a rounded template surface commensurate in size to at least a portion of an outer surface of the crayon body secured by the crayon positioner.

* * * * *